United States Patent [19]

Jorgensen

[11] 3,847,192
[45] Nov. 12, 1974

[54] TREE HARVESTING APPARATUS
[75] Inventor: Karl-Gunnar Jorgensen, Solentuna, Sweden
[73] Assignee: Logma Aktiebolag, Soderhamn, Sweden
[22] Filed: May 18, 1973
[21] Appl. No.: 361,624

[30] Foreign Application Priority Data
May 23, 1972  Sweden.............................. 006654
May 23, 1972  Sweden............................006555

[52] U.S. Cl........... 144/34 E, 144/3 D, 144/147 AS
[51] Int. Cl............................................... B27c 9/00
[58] Field of Search ........ 144/2 Z, 3 D, 34 R, 34 B, 144/34 E, 309 AC; 214/147 R, 147 AS

[56] References Cited
UNITED STATES PATENTS

| 3,238,981 | 3/1966  | Larson et al. ........................ 144/2 Z |
| 3,371,692 | 5/1968  | Larson et al...................... 144/3 D X |
| 3,487,864 | 1/1970  | Larson et al...................... 144/3 D X |
| 3,516,462 | 6/1970  | Martinson et al.................... 144/3 D |
| 3,590,760 | 7/1971  | Boyd.................................. 144/3 D |
| 3,675,691 | 7/1972  | Denovan et al................ 144/34 E X |
| 3,707,175 | 12/1972 | Propst.......................... 144/309 AC |
| 3,749,143 | 7/1973  | Hamilton........................... 144/3 D |

Primary Examiner—Andrew R. Juhasz
Assistant Examiner—W. D. Bray
Attorney, Agent, or Firm—Waters, Roditi, Schwartz & Nissen

[57] ABSTRACT

A tree harvesting apparatus includes a vehicle and a felling assembly carried by the vehicle. The felling assembly can grasp a first tree at its lower end and sever the tree from its root and while still holding this first cut tree in an upright position grasp a second tree at its lower end and sever it from its root, whereafter the two cut trees are held in the felling assembly parallel to and spaced from each other with their thick ends aligned. The felling assembly is pivoted about a horizontal axis at the end of a knuckle boom, which is mounted for rotation about a vertical axis on the vehicle, whereby the two cut trees held in the felling assembly can be transferred in a single operation to a dumping site or to an apparatus for further processing of the trees or alternatively to a delimbing and cross cutting assembly mounted on the same vehicle as the felling assembly. This delimbing and cross cutting assembly is designed to receive the two trees from the felling assembly and to delimb and cross cut both trees simultaneously.

9 Claims, 4 Drawing Figures

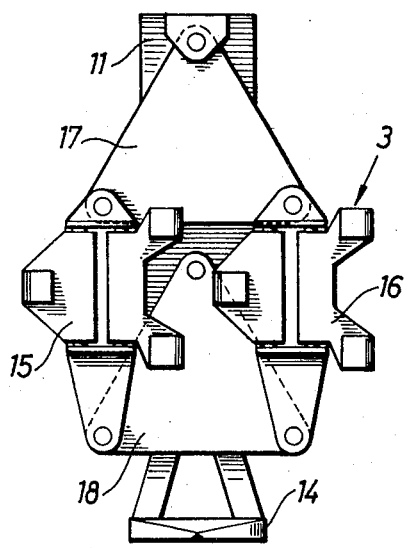
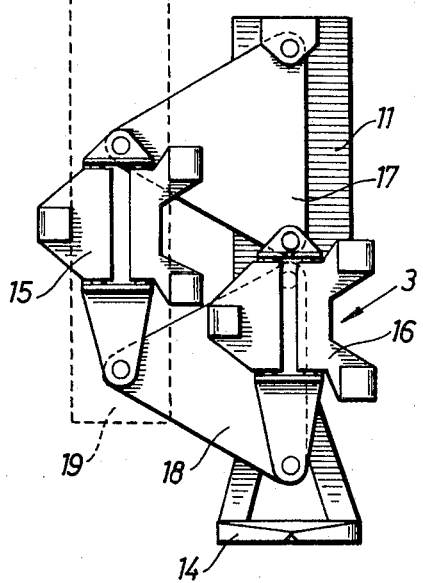
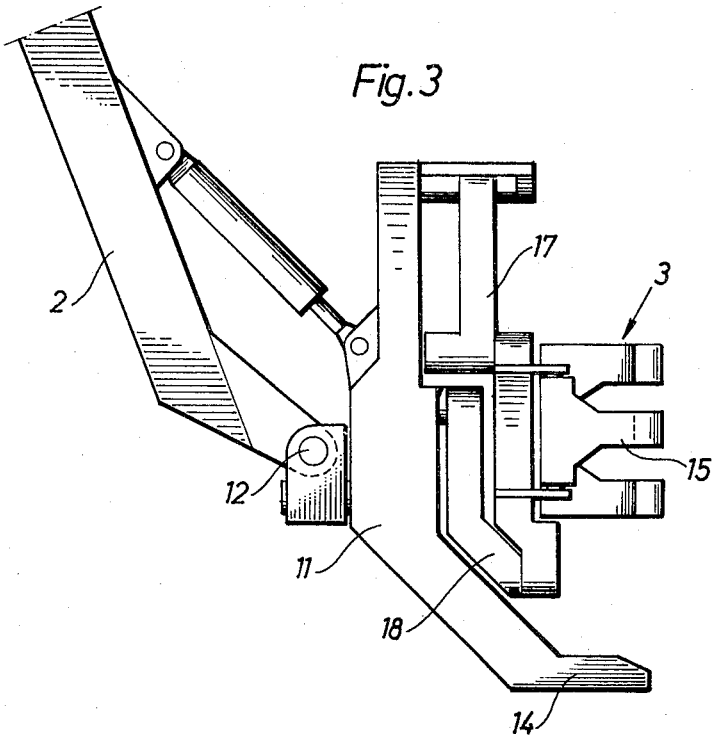

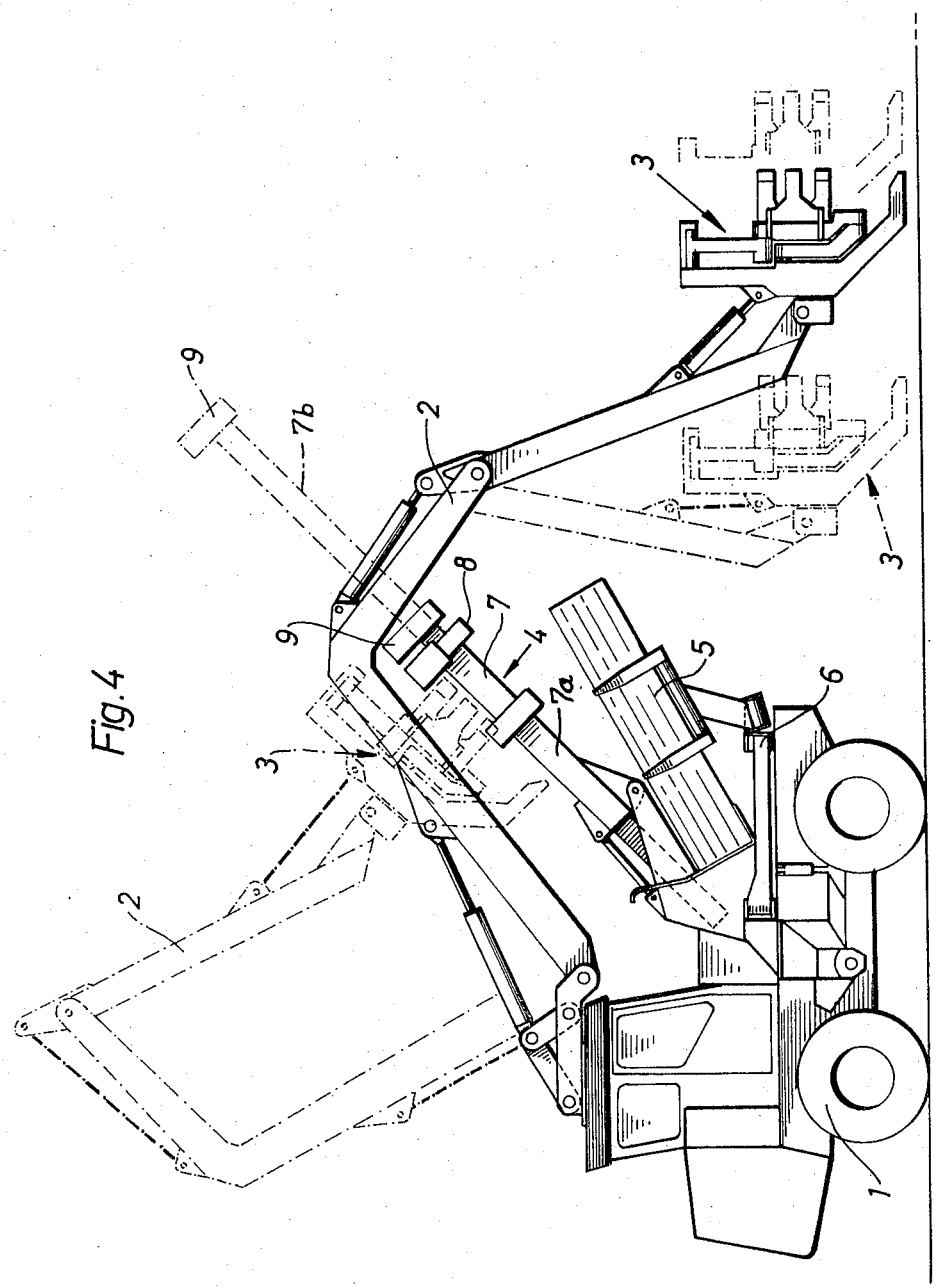

TREE HARVESTING APPARATUS

BACKGROUND OF THE INVENTION

The present invention relates to a tree harvesting apparatus including a vehicle and a cutting or felling assembly carried by said vehicle.

A tree harvesting apparatus is, generally speaking, an apparatus designed to perform one or several of the operations connected with the harvesting of the trees, as cutting or felling the grown trees, delimbing the cut trees, debarking, topping, cross cutting of the delimbed tree trunks to predetermined log lengths, etc.

The first operation in a tree harvesting process is the felling, that is the cutting or severing of the standing trees from their roots. The felling operation includes generally also the putting down of the severed tree to a more or less horizontal position either at its original site of growth or at a different location or alternatively the transfer of the cut tree to an equipment or apparatus for further processing of the tree, as for instance delimbing, debarking, topping, cross cutting to predetermined log lengths, etc. These equipments or apparatuses for the further processing of the cut trees may be arranged separately from the apparatus used for the felling of the trees or alterantively be mounted at least partially on the same apparatus so that the cut trees can be transferred by means of the felling assembly to other assemblies or equipments on the same apparatus for further processing, as for instance delimbing.

SUMMARY OF THE INVENTION

The primary object of the present invention is to provide a tree harvesting apparatus by means of which first of all the cutting of the growing trees and the subsequent transfer of the cut trees can be carried out at an increased pace as compared to prior art harvesting apparatuses.

The tree harvesting apparatus according to the invention comprises a vehicle and a felling assembly carried by this vehicle and is primarily characterized in that the felling assembly includes a frame, which in the normal working position of the felling assembly is substantially vertical, cutting means for severing a standing tree from its root mounted on the lower portion of said frame, two grapple devices each adapted for grasping and holding a tree close to its thicker end, movably mounted on said frame side by side and spaced from each other above said cutting means with their center axes substantially parallel to each other and to the center axis of the cutting means and means for moving said two grapple devices relative to the frame in such a manner that alternatively the one or the other grapple device can be moved to a position immediately above and in alignment with the cutting means.

The tree harvesting apparatus according to the invention provides as a first important advantage that two trees can be cut in a direct sequence, whereafter the two cut trees can be transferred and delivered simultaneously and in a single operation to a predetermined dumping site for the trees or to an equipment or apparatus for further processing of the trees. This makes it possible to step up the pace of the harvesting considerably, as it has been found that the transfer of the cut trees to a predetermined dumping site or to an apparatus for further processing of the trees requires a very large portion of the time required for the complete felling operation, as said transfer of the trees cannot be carried out at a too large speed due to the heavy weight and the large dimensions of the trees to be moved and the presence of still standing trees. With the harvesting apparatus according to the invention the two cut trees will during their subsequent common transfer be held parallel to each other with a predetermined spacing and with their thick ends aligned, whereby the trees can easily be fed into a suitable apparatus for simultaneous processing of the two trees, as for instance delimbing, topping and cross cutting to predetermined lengths.

A preferred embodiment of the harvesting apparatus according to the invention is in itself provided with an assembly for delimbing and preferably also topping and cross cutting to log lengths simultaneously of two trees disposed side by side and parallel to each other with a predetermined mutual spacing and with their thick ends aligned, in which case the felling assembly of the apparatus can transfer two cut trees directly and simultaneously to said processing assembly on the apparatus.

In the following the invention will be further described with reference to the accompanying drawings, which show schematically and by way of example a preferred embodiment of a tree harvesting apparatus according to the invention.

BRIEF DESCRIPTION OF THE DRAWINGS

FIG. 1 is a schematic front view of a felling assembly according to the invention illustrated with the two grapple devices in a neutral position;

FIG. 2 is also a schematic front view of the felling assembly but illustrated with the one grapple device holding a cut tree in a raised position and the other grapple device in a position immediately above the cutting tool;

FIG. 3 is a schematic side view of the felling assembly shown in the neutral position of FIG. 1; and FIG. 4 is a schematic side view of a preferred embodiment of a tree harvesting apparatus according to the invention, which is provided with a felling assembly of the type illustrated in FIGS. 1 to 3 and additionally with an assembly for further processing of the cut trees.

DESCRIPTION OF THE PREFERRED EMBODIMENT

The tree harvesting apparatus shown schematically and by way of example in FIG. 4 comprises a vehicle 1 of the wheeled tractor type, which carries an extendable and retractable knuckle boom 2, which is swingable about a vertical axis and at its outer end carries a felling assembly 3, and also a delimbing and cross cutting assembly generally designated with 4. The vehicle 1 carries also a log collector 4 for delimbed and cross cut logs. This collector 5 is mounted on the vehicle 1 by means of an arm 6 which is swingable in a horizontal plane so that the collector 5 can be moved between a receiving position immediately underneath the delimbing and cross cutting assembly 4 and a dumping position at the side of the vehicle 1.

The felling assembly 3 is shown in greater detail in FIGS. 1 to 3. The felling assembly 3 comprises a frame 11, which is mounted at the outer end of the boom 2 so as to be pivotal about a substantially horizontal mounting shaft 12. In the normal working position for the felling assembly 3, illustrated in FIGS. 1 to 3, the frame 11 is substantially vertical. On its lower portion the frame 11 carries a cutting or shearing mechanism 14 designed for severing a standing tree from its root. This cutting mechanism 14 can, as suggested in the drawing, for instance be of the well known scissor type, but can of course also be designed in any other, suitable, conventional manner, for instance including a chain saw swingable in a horizontal plane. Additionally the felling assembly 3 includes two grapples 15 and 16 each designed in any suitable conventional manner for grasping and holding a tree close to its thick end. The two grapples 15 and 16 are mounted on the frame 11 by means of two triangular links 17 and 18 in such a manner that the grapples 15 and 16 can be displaced in a parallel translatoric movement from the neutral position illustrated in FIG. 1 to such positions that either the one or the other grapple is disposed immediately above the cutting tool 41 with the center axis of the grapple substantially coinciding with the center axis of the cutting tool 14. The cutting tool 14 and the grapples 15 and 16 as well as the triangular pivot links 17 and 18 for the displacing of the grapples 15 and 16 can be operated by means of any suitable conventional power operating means, as for instance hydraulic cylinders, which are not shown or described in detail.

The felling assembly 3 is used in the following manner. One of the grapples, for instance the grapple 15, of the felling assembly 3 is moved by means of the links 17 and 18 downwards and inwards towards the cutting tool 14, whereby simultaneously the second grapple 16 is moved upwards and outwards from the cutting tool 14. By operation of the knuckle boom 2 the felling assembly 3 is then moved into position at the root of a tree to be felled. The tree is grasped at its lower end in the grapple 15 and severed from its root by means of the cutting tool 14. After the severing of this first tree 19 from its root the tree is lifted upwards and aside held in the grapple 15 in that the two links 17 and 18 are pivoted to the position shown in FIG. 2, whereby simultaneously the other grapple 16 is moved downwards and inwards to a position immediately above the cutting tool 14. By operation of the boom 2 the felling assembly 3, in which the recently cut tree 19 is held in the raised grapple 15, is then moved into position at the lower end of a second tree to be felled. This second tree is grasped at its lower end in the grapple 16 and severed from its root by means of the cutting tool 14. It is appreciated that the cutting tool 14 can be brought into a position very close to the root of the tree, whereby the cutting of the tree can be performed far down leaving a low stump height, even if obstacles for instance in the shape of boulders are present adjacent the root of the tree, as the first cut tree 19 is kept lifted above the ground in the grapple 15. After the severing of the second tree, which is held in the grapple 16, both grapples 15 and 16 are returned to the neutral position illustrated in FIG. 1, in which the trees are held parallel with a predetermined mutual spacing and with their thick ends aligned.

The two cut trees held in the felling assembly 3 can then by operation of the boom 2 be moved simultaneously to a desired position, for instance a predetermined dumping site or to an apparatus for further processing of the trees. As the felling assembly 3 is attached to the boom 2 so that it can be pivoted about its horizontal mounting shaft 12, the two cut trees held in the felling assembly 3 can be transferred from the vertical position to a horizontal position or to any suitable desired inclined position by rotation of the felling assembly 3 about the sahft 12, for instance by means of a hydraulic cylinder as illustrated in the drawing.

As mentioned in the foregoing, the tree harvesting apparatus shown by way of example in FIG. 4 is provided in itself with a delimbing and cross cutting assembly 4 for the further processing of the cut trees. The two trees which have been severed from their roots by the felling assembly 3 and which are now held in the felling assembly 3 are consequently transferred and delivered to the delimbing and cross cutting assembly 4 by retraction of the boom 2 and rotation of the felling assembly 3 about its mounting shaft 12, as indicated by dash-dotted lines in FIG. 4.

The delimbing and cross cutting assembly 4 comprises an extendable and retractable telescopic boom 7, which in the illustrated embodiment is mounted in an inclined position at an angle of about 45° to the horizontal. The innermost stationary section 7a of the telescopic boom 7 carries at its outermost end a grapple mechanism 8, which is designed to be able to grasp and hold simultaneously two trees disposed side by side parallel to each other with a predetermined mutual spacing. Consequently, this grapple mechanism 8 can receive and hold the two trees delivered to the delimbing assembly 4 by the felling assembly 3. Consequently, the spacing between the trees held in the grapple mechanism 8 corresponds to the spacing between the grapples 15 and 16 of the felling assembly 3, when these grapples 15 and 16 are in the neutral position shown in FIG. 1. The outermost movable section 7b of the telescopic boom 7 of the delimbing assembly 4 carries at its outermost end a delimbing mechanism 9, which includes a twin set of delimbing means so that it can in one operation and simultaneously delimb the two trees which are held parallel to each other and with a predetermined spacing in the grapple mechanism 8. The delimbing is performed in that the two trees are held in the grapple mechanism 8, which the delimbing mechanism 9 is moved along the trunks of the trees by extension of the telescopic boom 7, whereby the two trees are delimbed simultaneously over a length corresponding to the length of stroke of the telescopic boom 7. The mutual spacing between the two trees can for instance be about 1 m so that the two trees can be delimbed on all sides. The length of stroke of the telescopic boom 7 corresponds preferably to a standard log length to which the delimbed tree trunks are to be cut, for instance 3 m for pulp wood. The grapple mechanism 8 as well as the delimbing mechanism 9 can be designed in any suitable conventional way, wherefore a detailed description of these mechanisms is superfluous.

Associated with the grapple mechanism 8 there is further provided a cutting mechanism of suitable conventional type for each of the two tree trunks held in the grapple mechanism 8 so that the two tree trunks can be cross cut at the side of the grapple mechanism 8 facing the innermost end of the telescopic boom 7. Further, also the delimbing mechanism 9 is provided with a shearing tool of suitable conventional type for each of the two tree trunks, which shearing tools are designed to be activated automatically when the diameter of the tree trunks becomes less than a predetermined value, for instance 6 cm.

When the two trees held in the grapple mechanism 8 have been delimbed by extension of the delimbing mechanism 9 over a length corresponding to the stroke of the telescopic boom 7, the grapple mechanism 8 is opened and the delimbed lengths of the two trees are pulled in through the grapple mechanism 8 in that the delimbing mechanism 9 is closed tighter about the tree trunks and the telescopic boom 7 is retracted. The cross cutting of the delimbed lengths of the tree trunks close to the grapple mechanism 8 is carried out during the next extension of the delimbing mechanism 9 and thus during the delimbing of a second standard length of the two tree trunks. The cross cut lengths of the delimbed trunks will fall down into the collector 5. It is realized, however, that the top lengths of the tree trunks which are shorter than the predetermined standard length will not be held in the delimbing mechanism 9 and will consequently fall down on the ground and not into the collector 5.

The delimbing and cross cutting assembly 4 is designed for automatic operation, wherefore the operator can concentrate on the cutting and handling of the cut trees by means of the felling assembly 3 and the boom 2. As the delimbing and cross cutting of the delimbed trunks can be carried out at a faster rate than the cutting and bringing in of two trees, the delimbing and cross cutting assembly 4 will always be free to receive the trees last cut and brought in by means of the felling assembly 3.

I claim:

1. A tree harvesting apparatus comprising a vehicle and a felling assembly supported by said vehicle, said felling assembly including a frame, cutting means for severing a standing tree from its root, said cutting means being mounted on the low portion of said frame, two grapple means, each adapted for grasping and holding a tree close to its thicker end, and movably mounted on said frame side by side and mutually spaced above said cutting means with the center axes of said two grapple means parallel to each other and to the center axis of said cutting means, and means for moving said two grapple means relative to said frame in such a manner that alternatively the one or the other grapple means can be moved to a position immediately above and aligned with said cutting means, each of said two grapple means being mounted on said frame of said felling assembly by means of two mutually parallel and equally long pivot links, each of said links having one end pivoted in said frame about pivot axes perpendicular to and substantially intersecting the center axes of said cutting means, the opposite ends of said links being pivoted in the respective grapple means.

2. A tree harvesting apparatus comprising a vehicle, a retractable and extendable boom mounted for rotation about a vertical axis on said vehicle, and a felling assembly carried at the outermost end of said boom, said felling assembly including a support structure mounted for rotation about a substantially horizontal axis at the outermost end of said boom, cutting means for severing a standing tree from its root and being mounted on said support structure with a center axis of the cutting means perpendicular to said horizontal axis, a first grapple means and a second grapple means, each adapted for grasping and holding a tree at its root end with the longitudinal axis of the tree substantially coinciding with a center axis of the grapple means, said grapple means being movably mounted on said support structure with center axes mutually spaced and parallel to each other and to the center axis of said cutting means, and means for translationally moving said first and second grapple means relative to said support structure in directions oblique to the center axis of said cutting means so that either one of said first and second grapple means is movable both laterally and axially towards said cutting means to a position in which the center axis of said grapple means and the center axis of said cutting means substantially coincide, the other one of said first and second grapple means being moved simultaneously both laterally and axially away from said cutting means.

3. A tree harvesting apparatus as claimed in claim 2, wherein each of said first and second grapple means is mounted on said support structure by means of two mutually parallel and equally long pivot links, each of said links having one end pivoted in said support structure about pivot axes perpendicular to the center axis of said cutting means, the opposite ends of said links being pivoted in the respective grapple means.

4. A tree harvesting apparatus as claimed in claim 2, wherein said first and second grapple means are mounted on said support structure by means of two substantially identical triangular members, having each a first corner pivoted in said support structure about spaced pivot axes perpendicular to and intersecting the center axis of said cutting means, a second corner pivoted in said first grapple means about pivot axes perpendicular to the center axis of said first grapple means, and a third corner pivoted in the second grapple means about pivot axes perpendicular to the center axis of said second grapple means.

5. A tree harvesting apparatus as claimed in claim 2, comprising further a processing assembly including a telescopic boom having at least an innermost section mounted on said vehicle and an outermost section, gripping means mounted at the outermost end of said innermost section of said telescopic boom for gripping and holding two parallel trees at a predetermined fixed mutual distance, and delimbing means mounted at the outermost end of said outermost section of said telescopic boom and adapted for simultaneously delimbing two trees held in said gripping means on said innermost boom section, said delimbing means being moved along the trunk of the trees by extension of the telescopic boom, said gripping means on said innermost boom section being capable of receiving and gripping two severed trees held in said first and second grapple means of said felling assembly and brought to said gripping means on said innermost boom section of said processing assembly by operation of said rotatable and retractable and extendable boom carrying the felling assembly.

6. A tree harvesting apparatus as claimed in claim 5, wherein said processing assembly includes cross cutting means mounted on said innermost section of said telescopic boom substantially close to said gripping means for cross cutting two tree trunks held in said gripping means at the side of said gripping means facing the innermost end of said telescopic boom.

7. A tree harvesting apparatus as claimed in claim 5, wherein said processing assembly includes shearing means mounted on said outermost section of said telescopic boom substantially close to said delimbing means for cutting off the two tree trunks being delimbed by said delimbing means when the diameter of said tree trunks falls below a predetermined value.

8. A tree harvesting apparatus as claimed in claim 6, comprising further log collecting means mounted on said vehicle for receiving and collecting delimbed and cross cut logs from said processing assembly.

9. A tree harvesting apparatus as claimed in claim 5, wherein said telescopic boom is mounted on said vehicle in an inclined position.

* * * * *